(12) United States Patent
Thor et al.

(10) Patent No.: US 11,566,922 B2
(45) Date of Patent: Jan. 31, 2023

(54) OPTICAL ENCODER WITH ALIGNABLE RELATIVE POSITIONS BETWEEN ELEMENTS AND POSITION ALIGNMENT METHOD THEREOF

(71) Applicant: PIXART IMAGING INC., Hsin-Chu County (TW)

(72) Inventors: Chung-Min Thor, Penang (MY); Meng-Yee Lim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 289 days.

(21) Appl. No.: 16/878,054

(22) Filed: May 19, 2020

(65) Prior Publication Data

US 2021/0364329 A1 Nov. 25, 2021

(51) Int. Cl.
*G01D 5/36* (2006.01)
*G01D 5/347* (2006.01)
*G01D 5/245* (2006.01)
*G01D 18/00* (2006.01)

(52) U.S. Cl.
CPC ........... *G01D 5/366* (2013.01); *G01D 5/2457* (2013.01); *G01D 5/3473* (2013.01); *G01D 18/00* (2013.01)

(58) Field of Classification Search
CPC .... G01D 5/366; G01D 5/2457; G01D 5/3473; G01D 18/00; G01D 5/24438; G01D 5/34707; G01D 5/34715
See application file for complete search history.

(56) References Cited

U.S. PATENT DOCUMENTS

2004/0256546 A1* 12/2004 Hsiao ................ G01D 5/34707
250/231.13

* cited by examiner

*Primary Examiner* — Tony Ko
(74) *Attorney, Agent, or Firm* — Hauptman Ham, LLP

(57) ABSTRACT

There is provided an optical encoder with alignable relative positions between elements including an encoding medium, a sensor package and a memory. The sensor package includes a photodiode array and two alignment photodiodes opposite to the encoding medium. The memory records an alignment pattern associated with output signals of the two alignment photodiodes when the encoding medium and the sensor package are at nominal operating positions. When the encoding medium and the sensor package are not at the nominal operating positions, the relative position alignment is performed by adjusting current relative positions between the encoding medium and the sensor package to cause a current pattern associated with output signals of the two alignment photodiodes to be identical to the alignment pattern.

19 Claims, 13 Drawing Sheets

OPTICAL ENCODER WITH ALIGNABLE RELATIVE POSITIONS BETWEEN ELEMENTS AND POSITION ALIGNMENT METHOD THEREOF

BACKGROUND

1. Field of the Disclosure

This disclosure generally relates to an optical encoder and, more particularly, to an optical encoder and a position alignment method thereof that calibrate a relative distance between elements by pre-storing alignment patterns.

2. Description of the Related Art

Referring to FIG. 1, it is a block diagram of a conventional optical encoder that includes a light source 11, an encoding medium 13, photodiodes 15 and a processor 17. The photodiodes 15 detect light emitted from the light source 11 for illuminating the encoding medium 13. A trans-impedance amplifier (TIA) outputs four signals A, A', B and B' sequentially having a 90-degrees phase shift. The processor 17 compares the four signals A, A', B and B' to output two output signals CHA and CHB as shown in FIG. 2.

FIG. 2 is a timing diagram of the output signals CHA and CHB. It is seen from FIG. 2 that a combination of voltage levels of the output signals CHA and CHB have four states within one period of the encoding medium 13, and thus four positions of the encoding medium 13 can be indicated. As shown in FIG. 2, the four states respectively have a 90-degrees phase interval.

Referring to FIG. 3, it is an arrangement of relative positions of every element of FIG. 1. If it is desired to obtain the timing diagram as shown in FIG. 2, the light source 11, the encoding medium 13 and the photodiodes 15 have to be arranged at predetermined positions in the X-axis, Y-axis and Z-axis of space. However, during the assembling and installation, it is possible that at least one of the light source 11, the encoding medium 13 and the photodiodes 15 is not at the predetermined positions such that a position deviation is generated in at least one axis. In this case, the phase intervals corresponding to the four states can be larger or smaller than 90 degrees as shown in FIG. 4 to degrade the accuracy of position identification. This accuracy degradation is more serious in an optical encoder using interpolation technique.

Although the above accuracy degradation can be mitigated by more tightly assembling and installation control, significant cost is required.

Accordingly, it is necessary to provide an optical encoder with alignable relative positions between elements and having low cost, and a position alignment method thereof.

SUMMARY

The present disclosure provides an optical encoder adopting two additional alignment photodiodes. The optical encoder previously records the alignment pattern associated with output signals of the two alignment photodiodes as a basis of position alignment when every element of the optical encoder is at nominal operating positions.

The present disclosure further provides a position alignment method of an optical encoder in which the position alignment is accomplished by adjusting a current pattern associated with output signals of two alignment photodiodes to be identical to a pre-stored reference pattern.

The present disclosure provides an optical encoder including an optical sensor. The optical sensor is configured to receive modulated light from an encoding medium, and includes a detection photodiode array, a first photodiode and a second photodiode. The detection photodiode array is arranged opposite to the encoding medium. The first photodiode and the second photodiode are respectively arranged at two sides of the detection photodiode array, and each of the first photodiode and the second photodiode has a trapezoid sensing surface.

The present disclosure further provides a position alignment method of an optical encoder which includes an encoding medium and an optical sensor. The position alignment method includes the steps of: previously determining a reference pattern according to reference output signals of the first photodiode and the second photodiode; determining a current pattern according to current output signals of the first photodiode and the second photodiode; and adjusting relative positions between the encoding medium and the optical sensor to cause the current pattern to be identical to the reference pattern.

The present disclosure further provides a position alignment method of an optical encoder which includes an encoding medium and an optical sensor. The position alignment method includes the steps of: previously determining multiple alignment patterns according to reference output signals of the first photodiode and the second photodiode, wherein one of the multiple alignment patterns is a reference pattern when the encoding medium and the optical sensor are at predetermined relative positions, and other alignment patterns are sub-reference patterns when the encoding medium and the optical sensor are at different relative positions; Step A: determining a current pattern according to current output signals of the first photodiode and the second photodiode; Step B: comparing the current pattern with the multiple sub-reference patterns to determine a deviation direction between the encoding medium and the optical sensor; and Step C: moving at least one of the encoding medium and the optical sensor toward an opposite direction of the deviation direction, and then repeating the Step A to the Step C till the current pattern is identical to the reference pattern.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
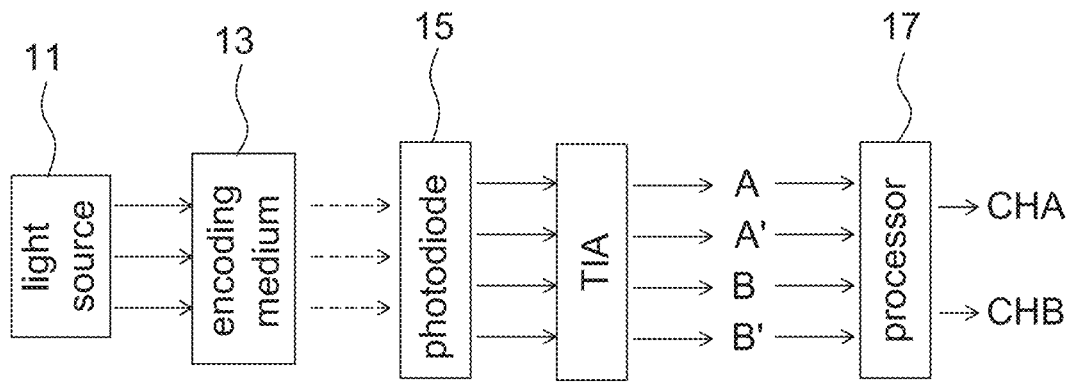
FIG. 1 is a block diagram of a conventional optical encoder.
Figure 2:
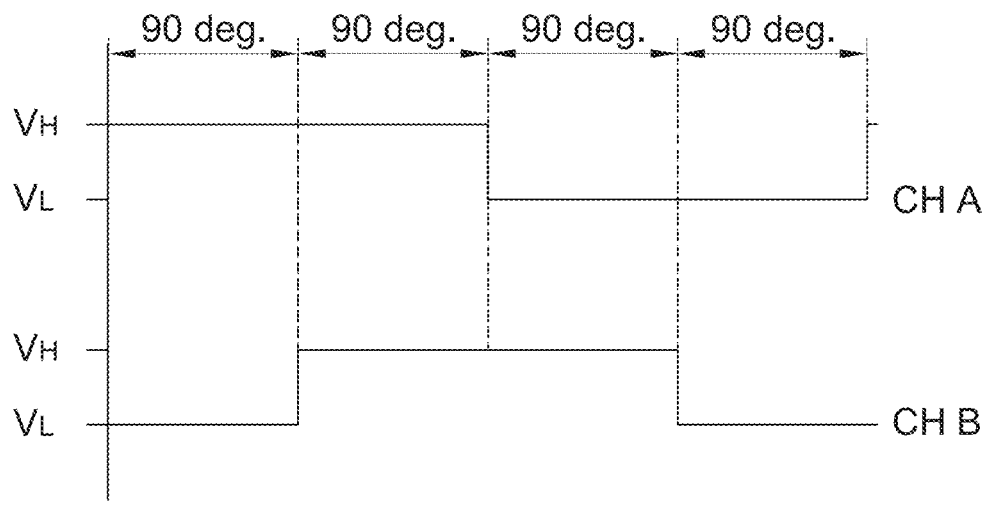
FIG. 2 is a timing diagram of output signals of the optical encoder in FIG. 1.
Figure 3:
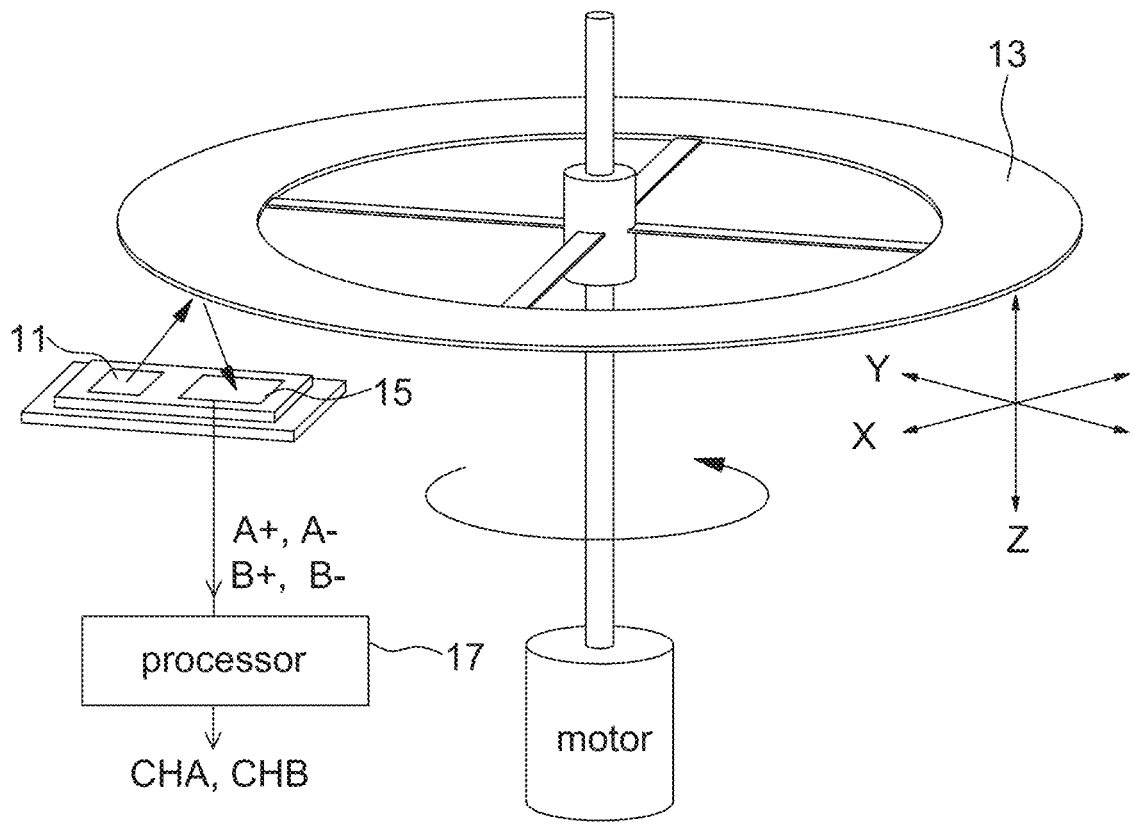
FIG. 3 is a schematic diagram of a conventional optical encoder.
Figure 4:
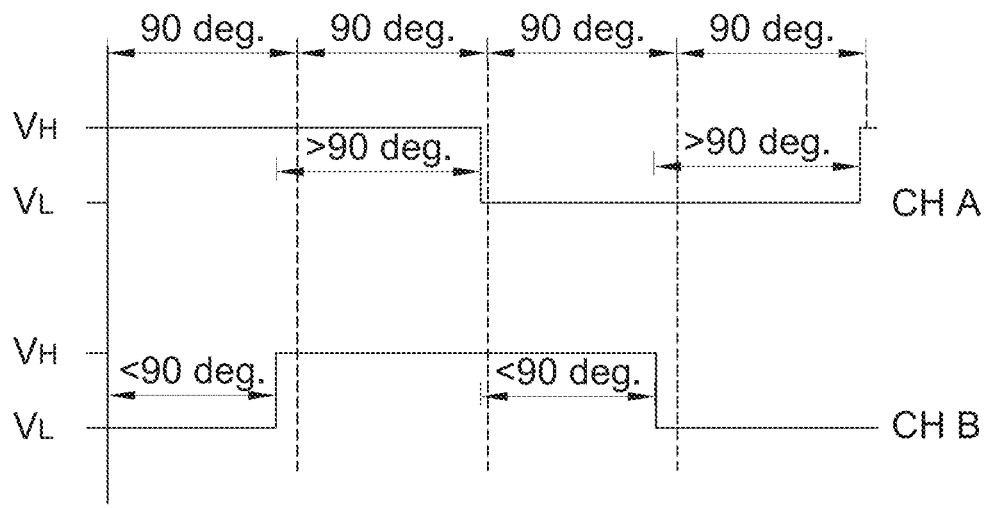
FIG. 4 is a schematic diagram of output signals of the optical encoder in FIG. 3 in which elements are not arranged at nominal positions.

The optical encoder of the present disclosure is to arrange two additional alignment photodiodes respectively at two sides of a detection photodiode array that is to generate output signals of a channel A and a channel B, e.g., referring to FIG. 2. In the present disclosure, no special designed code slits is required. The calibration of element positions is accomplished by previously recording a reference pattern associated with output signals of the two alignment photodiodes when every element of the optical encoder is at nominal positions, and by adjusting relative positions between elements in the assembling and installation procedure to cause a current pattern generated according to the output signals of the two alignment photodiodes to be identical to the pre-stored reference pattern.

Figure 5A:
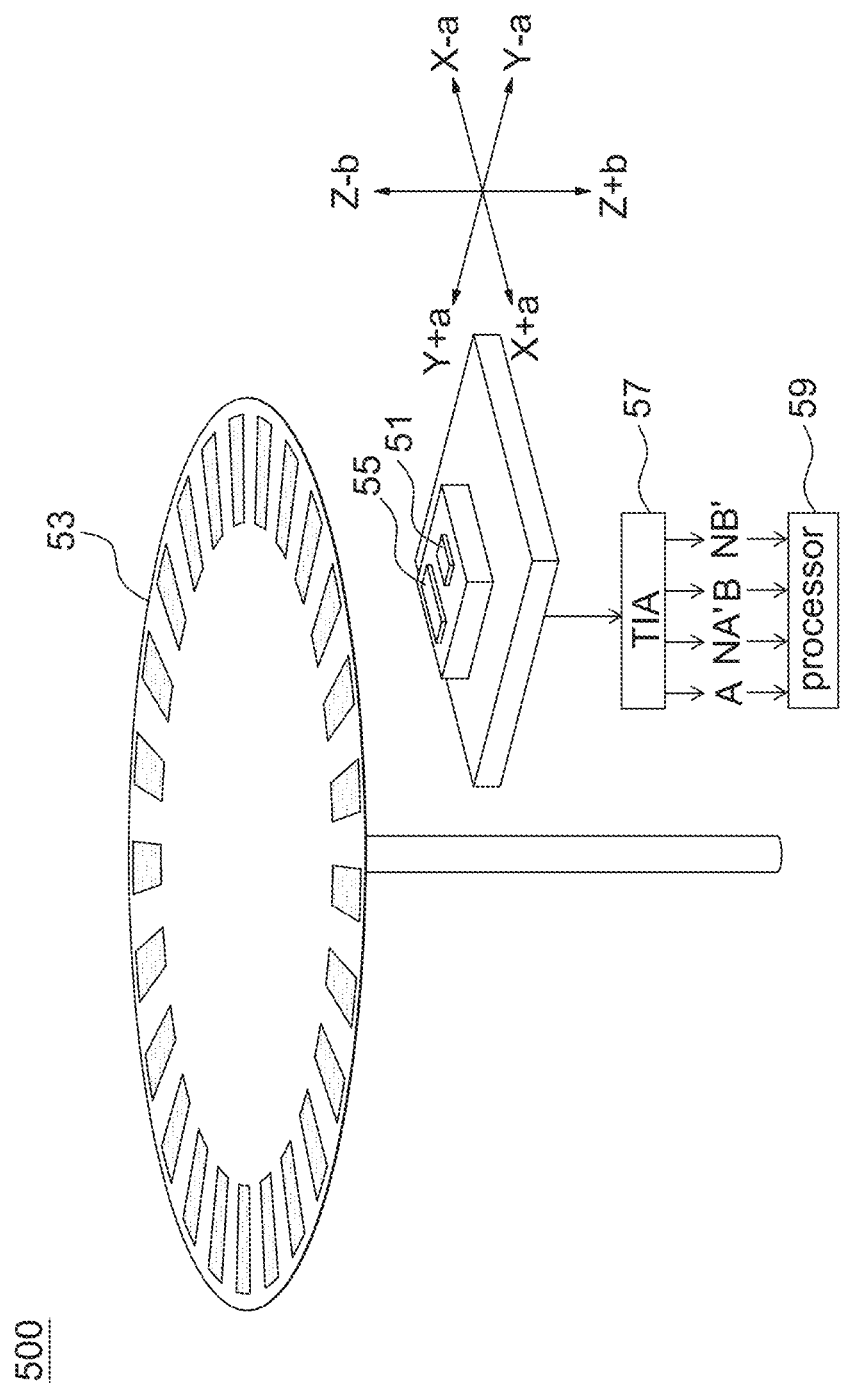
FIG. 5A is a schematic diagram of an optical encoder according to one embodiment of the present disclosure.

Referring to FIG. 5A, it is a schematic diagram of an optical encoder 500 according to one embodiment of the present disclosure. The optical encoder 500 includes a light source 51, an encoding medium 53 (e.g., a code wheel or a code strip according to different applications), an optical sensor 55, a trans-impedance amplifier (TIA) 57 and a processor 59. The processor 59, for example, is an application specific integrated circuit (ASIC) or a digital signal processor (DSP). According to different applications, the light source 51 and the optical sensor 55 are embedded in the same encapsulation or in different encapsulations.

The light source 51 is a coherent light source, a partially coherent light source or a non-coherent light source, and is used to project emission light of an identifiable spectrum toward the encoding medium 53. The light source 51 is, for example, an infrared light emitting diode or an infrared laser diode, but not limited thereto.

Figure 5B:
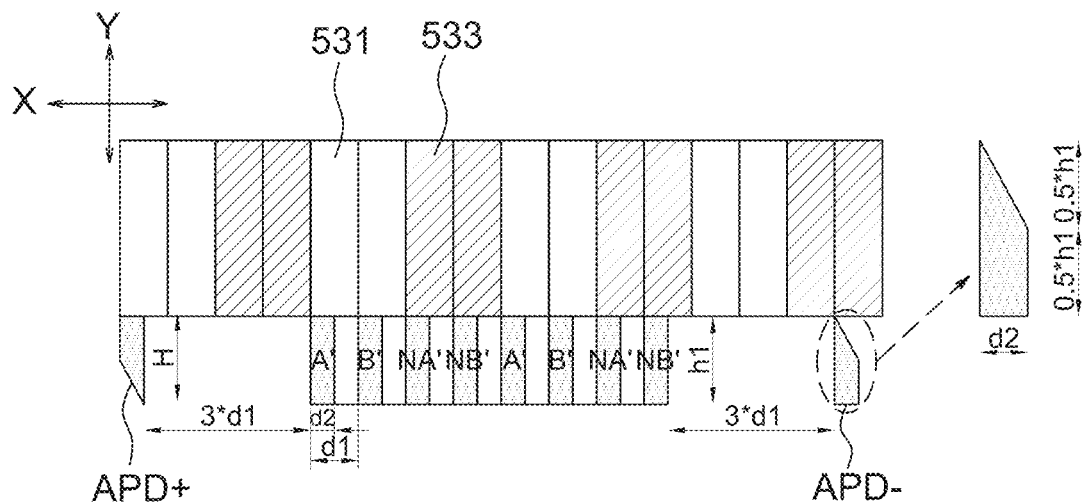
FIG. 5B is a schematic diagram of the encoding medium and optical sensor of an optical encoder according to one embodiment of the present disclosure.

Referring to FIG. 5B together, in a reflective type optical encoder, codes of the encoding medium 53 include reflective parts (or reflective regions) and non-reflective parts (or non-reflective regions). For example, blank regions 531 indicate the reflective parts and regions filled with slant lines 533 indicate the non-reflective parts, or vice versa. The reflective parts 531 are used to reflect the emission light from the light source 51 toward the optical sensor 55. The non-reflective parts 533 are hollowed regions or coated with light absorption material without particular limitations as long as most of the emission light from the light source 51 is not reflected thereby. In a transmission type optical encoder, the blank regions 531 indicate reflective parts and the regions filled with slant lines 533 indicate transmissive parts, or vice versa.

As shown in FIG. 5B, the blank regions 531 and the slant-line regions 533 are arranged alternatively to form the codes on the encoding medium 53 for modulating incident light.

That is, the encoding medium 53 is a reflective type or a transmission type on which codes of a predetermined pattern are formed to perform the light modulation when the emission light from the light source 51 is reflected thereby or passing therethrough. The encoding medium 53 performs a linear motion, a curve motion or a rotary motion according to different applications. In operation, the encoding medium 53 has a relative displacement with respect to the light source 51 and the optical sensor 55, and the codes of the predetermined pattern thereon modulate the emission light.

In the present disclosure, the optical sensor 55 includes a detection photodiode array, a first photodiode APD+ and a second photodiode APD−.

The detection photodiode array includes multiple photodiodes 53 (e.g., A', B', NA' and NB' shown in FIG. 5B) arranged corresponding to the codes on the encoding medium 53 to receive modulated light which is formed by modulating the emission light form the light source 51. For example, when the encoding medium 53 is a reflective type, the light source 51 and the optical sensor 55 are arranged at the same side of the encoding medium 53; whereas, when the encoding medium 53 is a transmission type, the light source 51 and the optical sensor 55 are arranged at opposite sides of the encoding medium 53.

After the multiple photodiodes A', B', NA' and NB' receive the modulated light, the TIA 57 generates, e.g., a first signal A'=sin+, a second signal B'=cos+, a NA'=third signal sin− and a fourth signal NB'=cos− sequentially having a 90-degrees phase shift, wherein the first signal sin+ is a sine signal, the second signal cos+ is a cosine signal, the third signal sin− and the first signal sin+ are 180° output of phase, and the fourth signal cos− and the second signal cos+ are 180° output of phase. However, the present disclosure is not limited thereto.

The operation of the TIA 57 is known to the art and thus details thereof are not described herein.

The processor 59 processes (e.g., performing the subtraction between A' and NA' as well as between B' and NB') output signals of the multiple photodiode A', B', NA' and NB' to generate two output signals CHA and CHB as shown in FIG. 2.

Referring to FIG. 5B again, the optical encoder 500 of the present disclosure further includes two alignment photodiodes (e.g., a first photodiode APD+ and a second photodiode APD−) arranged at two sides of the detection photodiode array, respectively. Each of the first photodiode APD+ and the second photodiode APD− has a trapezoid sensing surface. The TIA 57 further converts and amplifies photo current from the first photodiode APD+ and the second photodiode APD− to generate voltage signals.

For example, the first photodiode APD+ and the second photodiode APD− have the same structure as that of the multiple photodiodes A', B', NA' and NB', whereas a part of (e.g., a triangular shape) sensing surface of the first photodiode APD+ and the second photodiode APD− is covered by opaque material such that only incident light passing the trapezoid sensing surface is detectable by the alignment photodiodes. In one aspect, a width d2 of a sensing surface (e.g., rectangular regions filled with dots) of each of the photodiodes A', B', NA' and NB' as well as a width d2 of each of the first photodiode APD+ and the second photodiode APD− are a half of a width d1 of the reflective parts 531 and the non-reflective parts 533.

In one aspect, the optical encoder 500 has a single track structure, and the detection photodiode array is at the same track as the first photodiode APD+ and the second photodiode APD−, wherein said "same track" is referred to that positions at the Y-axis direction are substantially identical. In the multi-tracks structure, the first photodiode APD+ and the second photodiode APD− are at the same track as some detection photodiodes, but at different tracks from other detection photodiodes (e.g., index photodiodes, but not limited to) according to different applications.

It is appreciated that, for illustrating the relative positions between the optical sensor 55 and codes of the encoding medium 53, the detection photodiode array, the first photodiode APD+ and the second photodiode APD− as well as the codes of the encoding medium 53 are shown as side by side in FIG. 5B. In actual arrangement, the optical sensor 55 is located along a height direction (i.e. Z-axis) from the encoding medium 53 as shown in FIG. 5A.

In one aspect, a first distance 3*d*1 from the first photodiode APD+ to a first side (e.g., left side in FIG. 5B) of the detection photodiode array is identical to a second distance 3*d*1 from the second photodiode APD− to a second side (e.g., right side in FIG. 5B) of the detection photodiode array. The first photodiode APD+ is opposite to one of the reflective parts 531 when the second photodiode APD− is opposite to (e.g., by moving the encoding medium 53) one of the non-reflective parts 533 such that when the first photodiode APD+ has a maximum output signal, the second photodiode APD− has a minimum output signal, or vice versa.

In FIG. 5B, the long side (i.e., a right side of the trapezoid sensing surface of the first photodiode APD+ and a left side of the trapezoid sensing surface of the second photodiode APD−) of two parallel sides of the trapezoid sensing surface of the first photodiode APD+ and the second photodiode APD− is directed to the detection photodiode array. Meanwhile, the tilted side of the trapezoid sensing surface of the first photodiode APD+ and the second photodiode APD− is directed to a different direction, e.g., a tilted side of the trapezoid sensing surface of the first photodiode APD+ faces a lower direction and a tilted side of the trapezoid sensing surface of the second photodiode APD− faces an upper direction.

Figure 6:
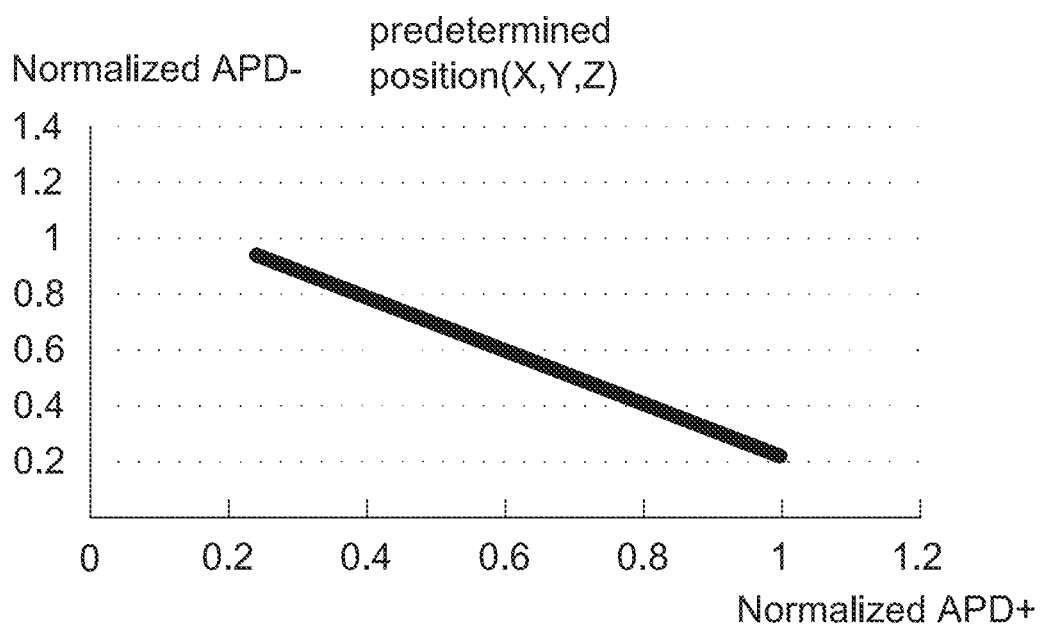
FIG. 6 is a schematic diagram of a reference pattern recorded by an optical encoder according to one embodiment of the present disclosure.

The photo current outputted by the first photodiode APD+ and the second photodiode APD− are also converted and amplified by the TIA 57 to generate voltage signals. The processor 59 normalizes the voltage signal associated with the first photodiode APD+(e.g., dividing the voltage signal by a maximum voltage signal generated by the first photodiode APD+ or by a summation of voltage signals of the first photodiode APD+ and the second photodiode APD−), and takes the normalized voltage signal as the output signal of the first photodiode APD+. The processor 59 also normalizes the voltage signal associated with the second photodiode APD− (e.g., dividing the voltage signal by a maximum voltage signal generated by the second photodiode APD− or by a summation of voltage signals of the first photodiode APD+ and the second photodiode APD−), and takes the normalized voltage signal as the output signal of the second photodiode APD−. In this way, the reference pattern shown in FIG. 6 is generated. The reference pattern indicates the relationship between values of the output signals from the two alignment photodiodes to be recorded in the memory of the optical encoder 500. The memory is selected from EEPROM, RAM or Flash memory, but not limited to.

More specifically, the optical encoder 500 further includes a memory used to record the reference pattern associated with reference output signals of the first photodiode APD+ and the second photodiode APD− when the encoding medium 53 and the optical sensor 55 (or a package including the optical sensor 55) are at predetermined relative positions, e.g., (X,Y,Z) shown in FIG. 6, wherein said "reference output signals" is referred to the output signal obtained before shipment.

In another aspect, the memory of the optical encoder 500 further previously records multiple sub-reference patterns associated with reference output signals of the first photodiode APD+ and the second photodiode APD− when the encoding medium 53 and the optical sensor 55 (or the package including the optical sensor 55) are at different relative positions, wherein said sub-reference patterns are also obtained before shipment but when the encoding medium 53 and the optical sensor 55 are not at nominal relative positions (i.e. not at the predetermined relative positions). The sub-reference patterns are used in step-adjustment of the relative positions that will be illustrated hereinafter by using one example.

Figure 7A:
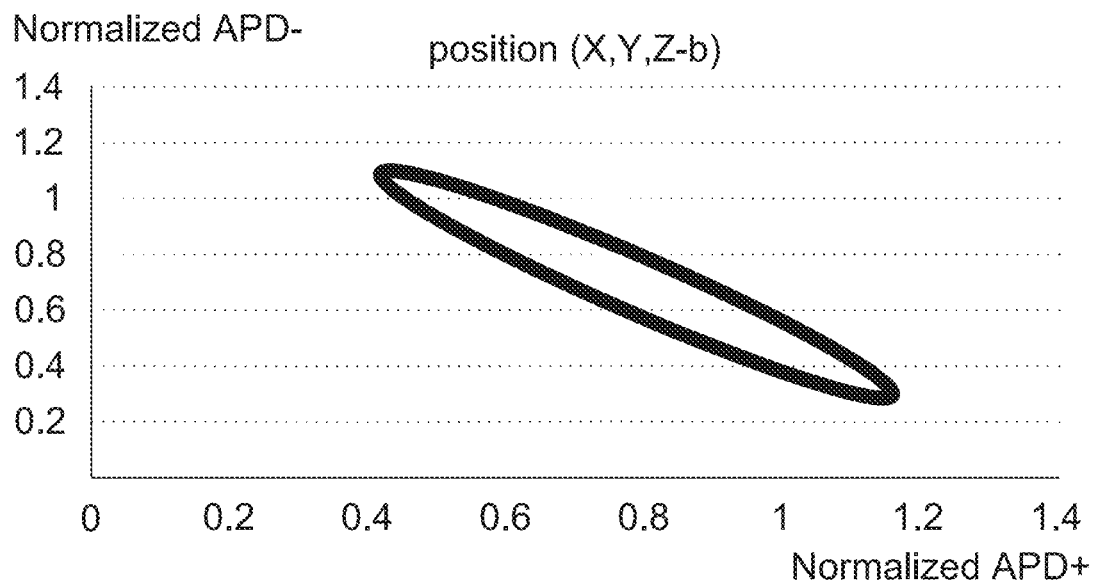
FIGS. 7A-7H are schematic diagrams of other sub-reference patterns recorded by an optical encoder according to some embodiments of the present disclosure.
Figure 7B:
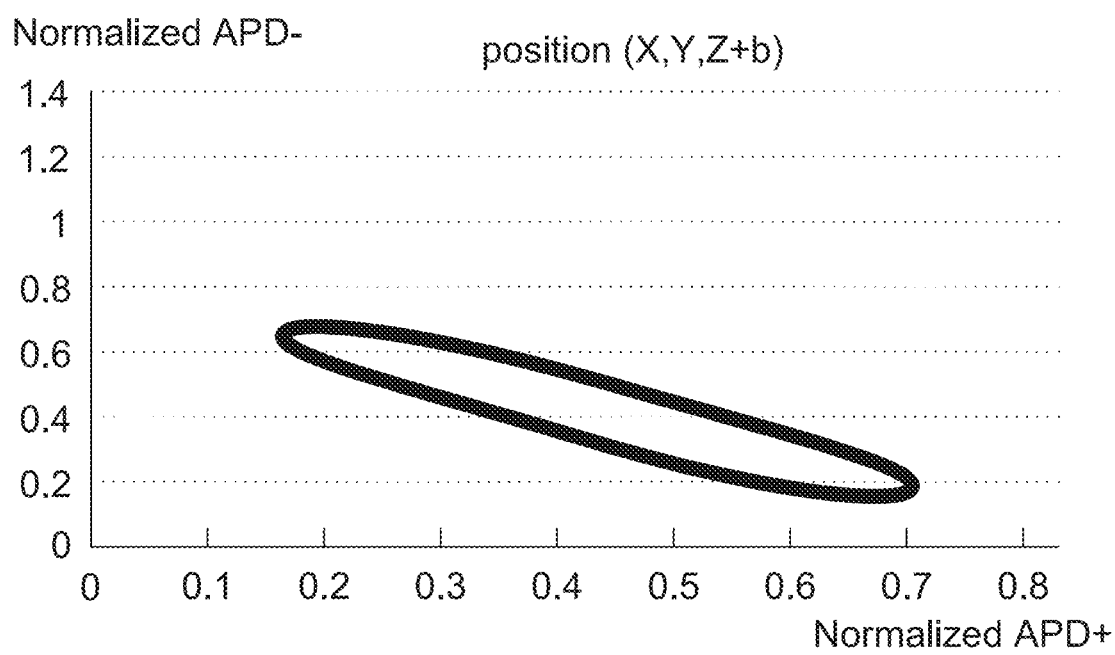
Figure 7C:
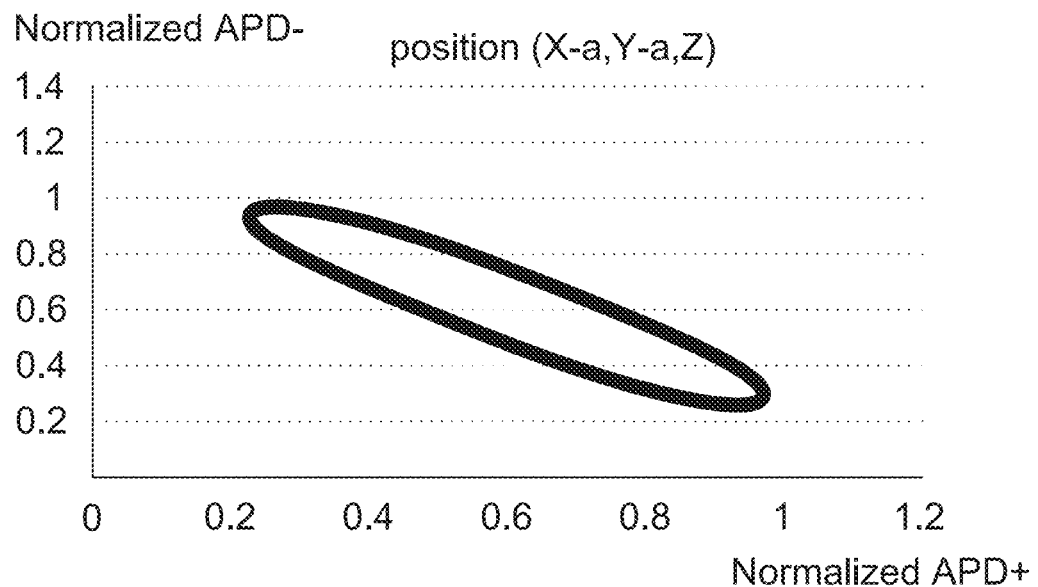
Figure 7D:
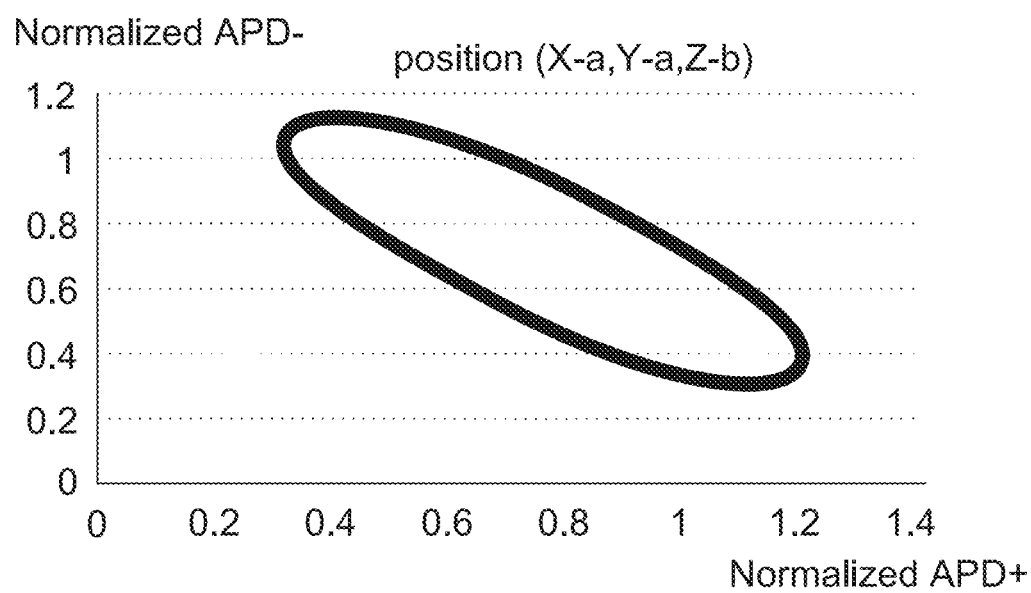
Figure 7E:
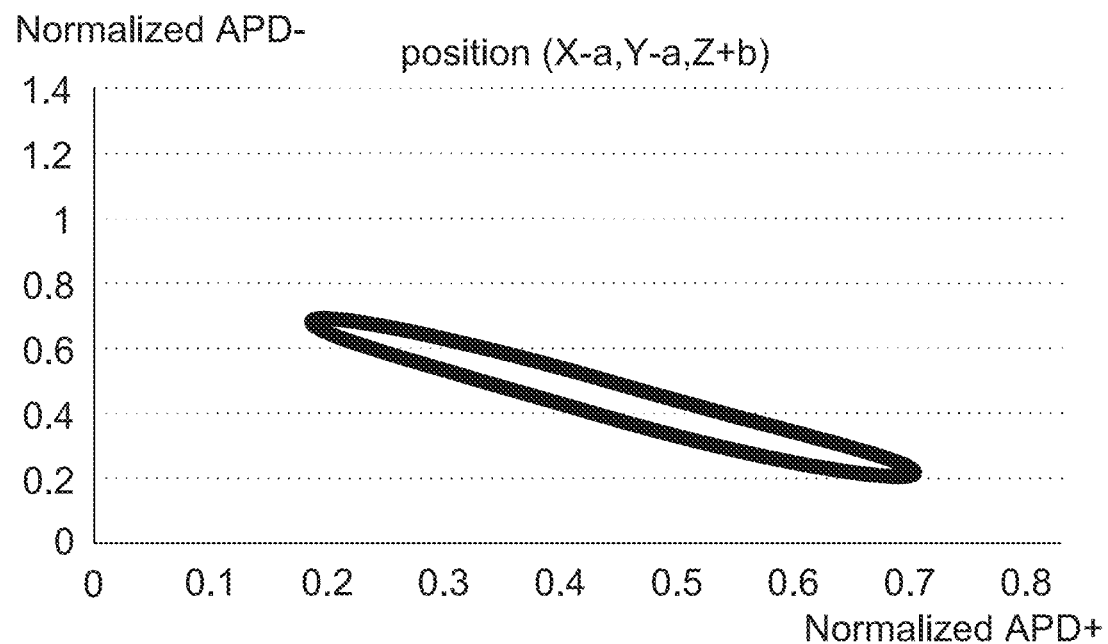
Figure 7F:
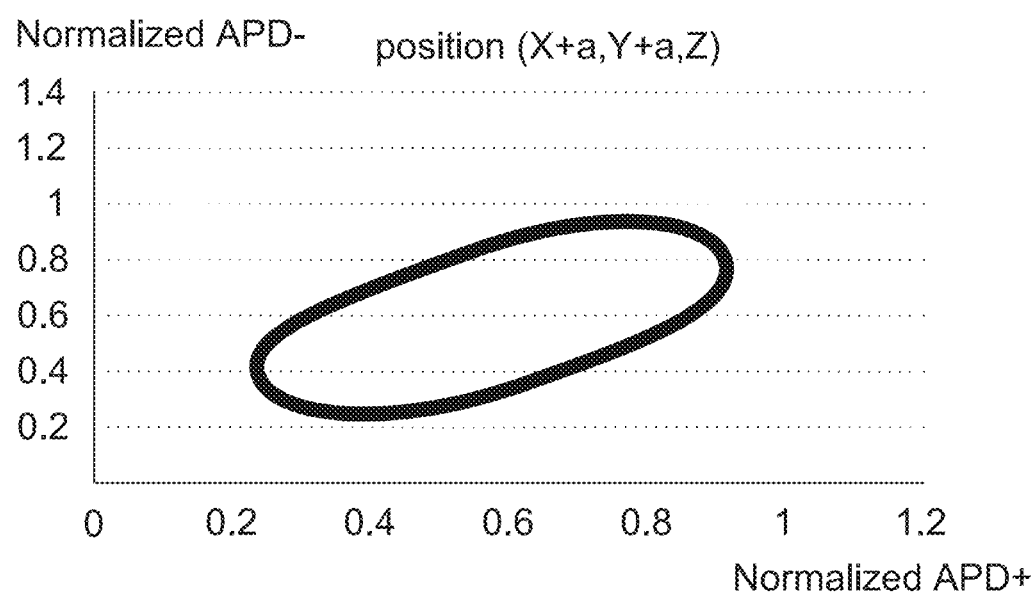
Figure 7G:
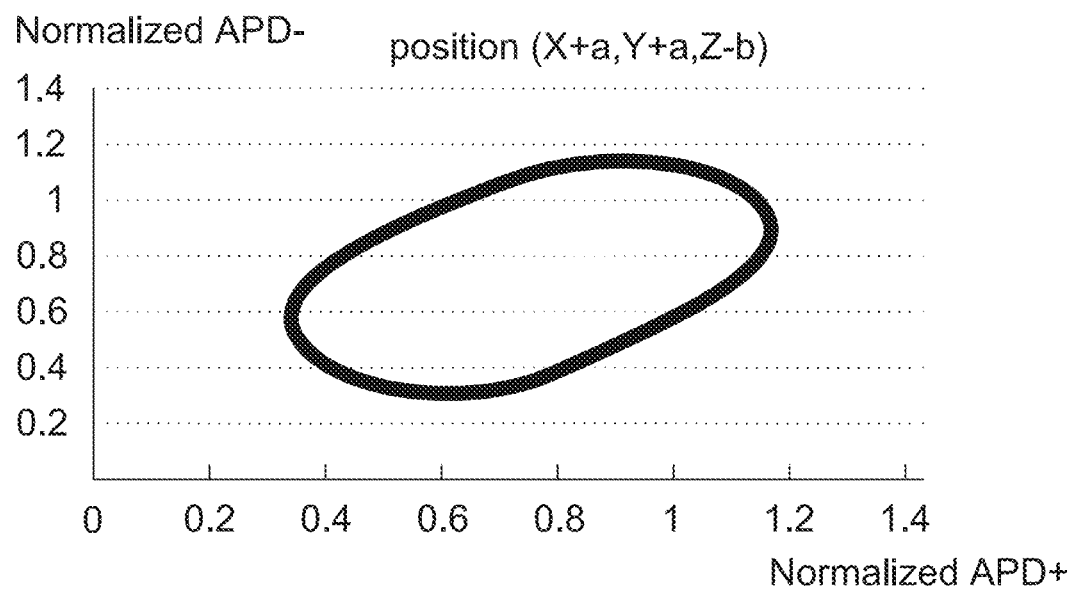
Figure 7H:
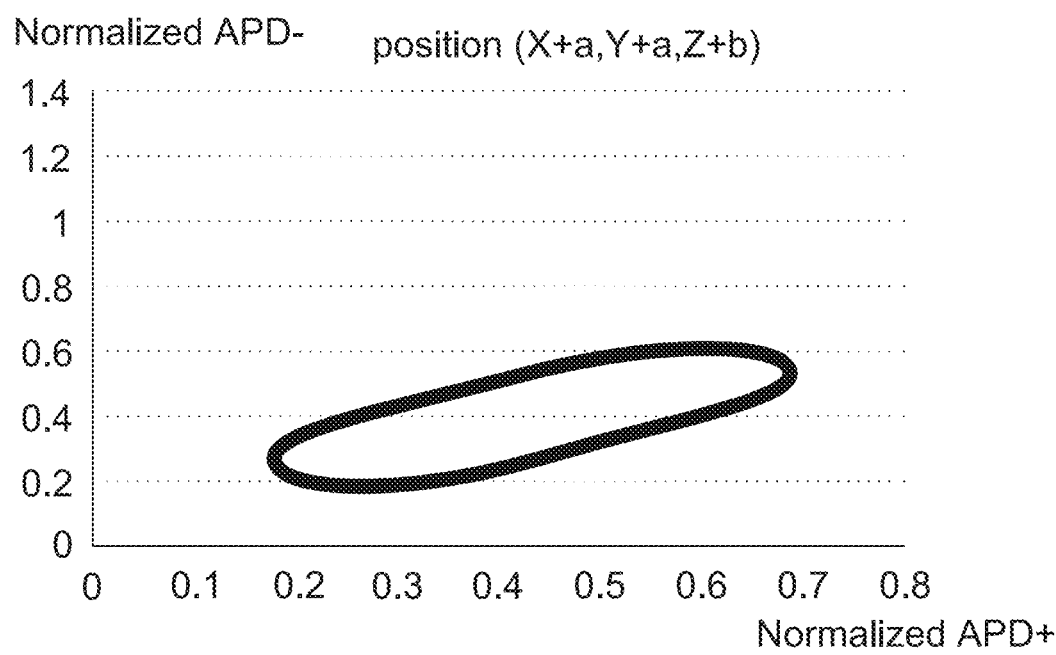

In the present disclosure, the relative positions between the encoding medium 53 and the optical sensor 55 (or the package including the optical sensor 55) include a tangential direction (e.g., X-axis in FIG. 5A) position, a radius direction (e.g., Y-axis in FIG. 5A) position and a height direction (e.g., Z-axis in FIG. 5A) position. For example, FIGS. 7A and 7B are the sub-reference pattern indicating that the relative positions between the encoding medium 53 and the optical sensor 55 have ±b position deviation along the height direction; FIG. 7C is the sub-reference pattern indicating that the relative positions between the encoding medium 53 and the optical sensor 55 have −a position deviation along the tangential direction and radius direction; FIGS. 7D and 7E are the sub-reference pattern indicating that the relative positions between the encoding medium 53 and the optical sensor 55 have −a position deviation along the tangential direction and radius direction as well as ±b position deviation along the height direction; FIG. 7F is the sub-reference pattern indicating that the relative positions between the encoding medium 53 and the optical sensor 55 have +a position deviation along the tangential direction and radius direction; and FIGS. 7G and 7H are the sub-reference pattern indicating that the relative positions between the encoding medium 53 and the optical sensor 55 have +a position deviation along the tangential direction and radius direction as well as ±b position deviation along the height direction.

It should be mentioned that the reference pattern and multiple sub-reference patterns stored in the memory are not limited to those shown in FIG. 6 and FIGS. 7A-7H. If different reflective conditions of the encoding medium 53 and total indicator runout (TIR) are considered, the reference pattern and multiple sub-reference patterns being generated are different.

Figure 8A:
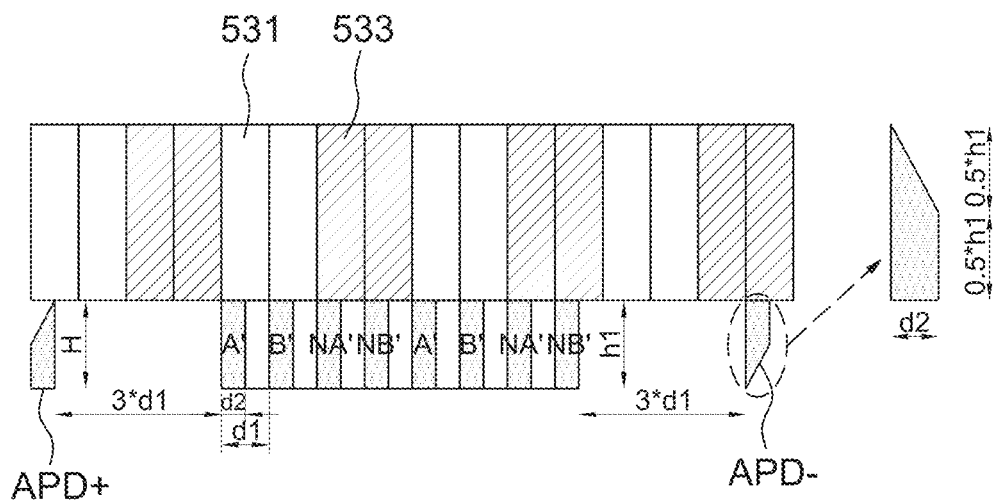
FIG. 8A is a schematic diagram of the encoding medium and optical sensor of an optical encoder according to another embodiment of the present disclosure.
Figure 8B:
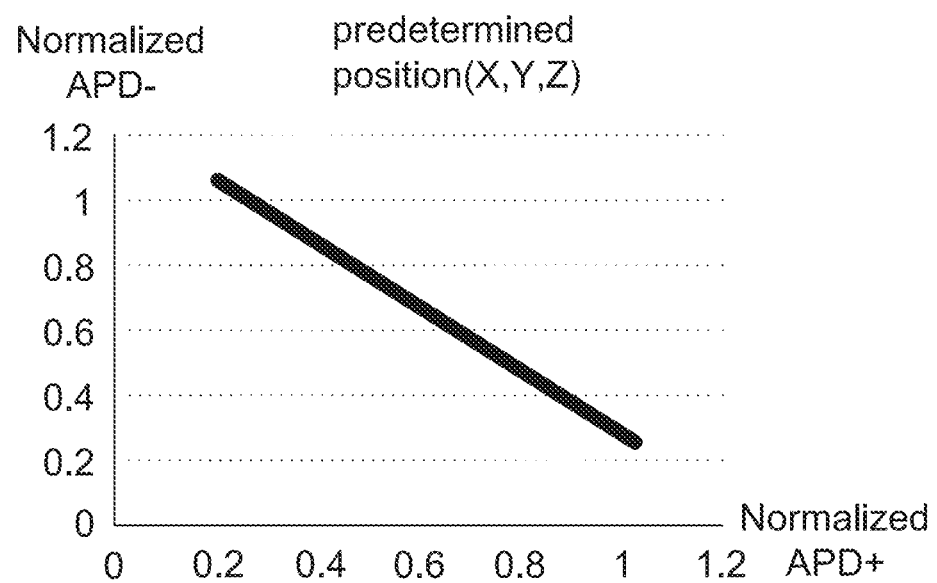
FIG. 8B is a schematic diagram of a reference pattern recorded by an optical encoder in FIG. 8A.

Referring to FIG. 8A, it is a schematic diagram of the codes of encoding medium 53 and the optical sensor 55 of an optical encoder 500 according to another embodiment of the present disclosure. The difference between FIG. 8A and FIG. 5B is that in FIG. 8A the tilted side of the trapezoid sensing surface of the first photodiode APD+ and the second photodiode APD− directs in the direction different from those in FIG. 5B, and since arrangement of other elements are identical to those in FIG. 5B, details thereof are not repeated herein. FIG. 8B is a schematic diagram of a reference pattern recorded using the optical encoder 500 of FIG. 8A. As mentioned above, in other aspects the optical encoder 500 further records sub-reference patterns, e.g. referring to FIGS. 7A-7H, when the encoding medium 53 and the optical sensor 55 (or the package including the optical sensor 55) are at different relative positions.

Figure 9A:
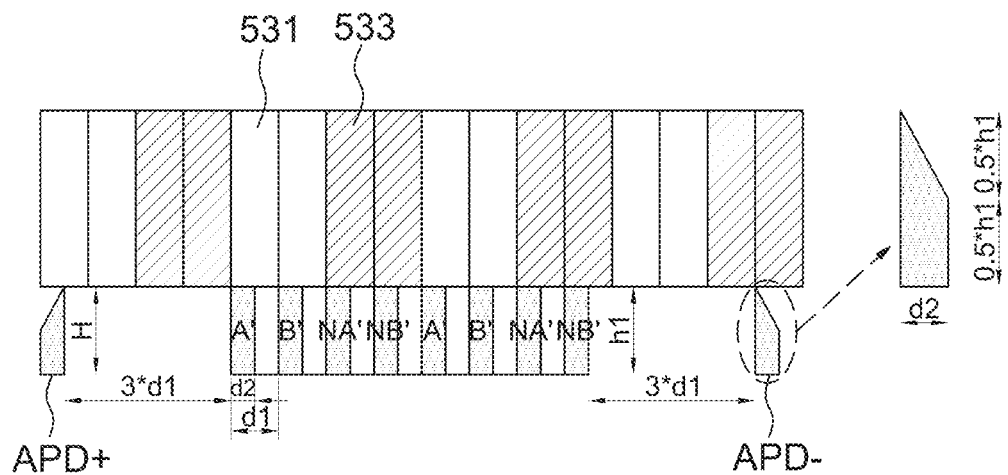
FIG. 9A is a schematic diagram of the encoding medium and optical sensor of an optical encoder according to an alternative embodiment of the present disclosure.
Figure 9B:
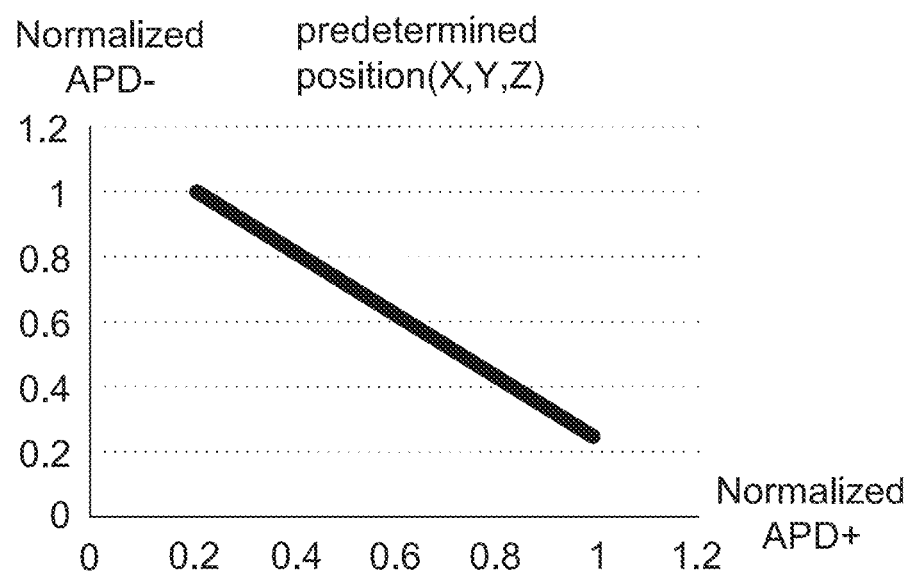
FIG. 9B is a schematic diagram of a reference pattern recorded by an optical encoder in FIG. 9A.

Referring to FIG. 9A, it is a schematic diagram of the codes of encoding medium 53 and the optical sensor 55 of an optical encoder 500 according to an alternative embodiment of the present disclosure. The difference between FIG. 9A and FIG. 5B is that in FIG. 9A the tilted side of the trapezoid sensing surface of the first photodiode APD+ directs in the direction different from that in FIG. 5B such that a tilted side of the trapezoid sensing surface of each of the first photodiode APD+ and the second photodiode APD− directs to the same direction. Because the arrangement of other elements are identical to those in FIG. 5B, details thereof are not repeated herein. FIG. 9B is a schematic diagram of a reference pattern recorded using the optical encoder 500 of FIG. 9A. As mentioned above, in other aspects the optical encoder 500 further records sub-reference patterns, e.g. referring to FIGS. 7A-7H, when the encoding medium 53 and the optical sensor 55 (or the package including the optical sensor 55) are at different relative positions.

Figure 10A:
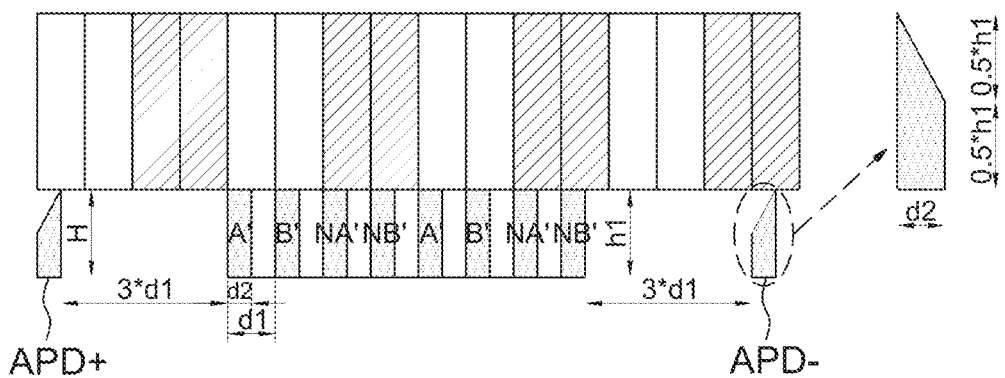
FIG. 10A is a schematic diagram of the encoding medium and optical sensor of an optical encoder according to an alternative embodiment of the present disclosure.
Figure 10B:
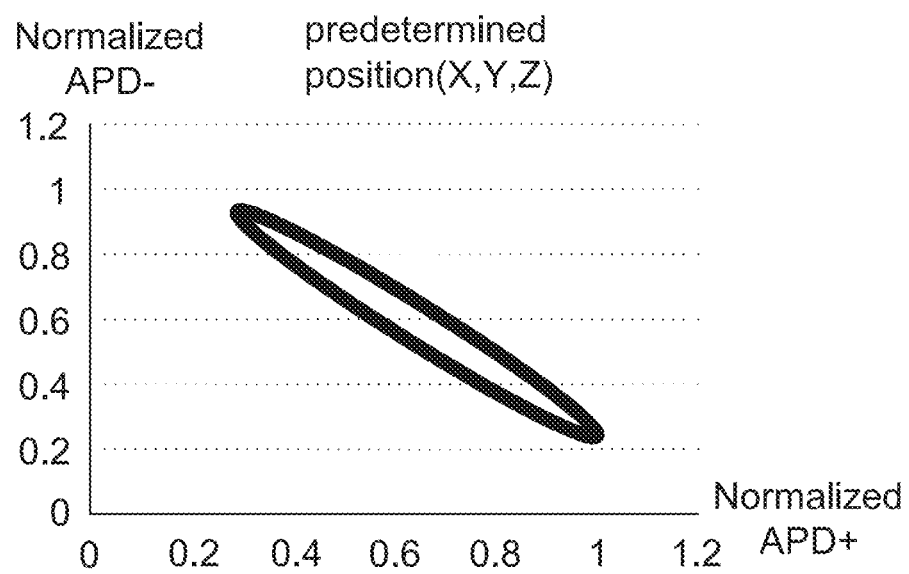
FIG. 10B is a schematic diagram of a reference pattern recorded by an optical encoder in FIG. 10A.

Referring to FIG. 10A, it is a schematic diagram of the codes of encoding medium 53 and the optical sensor 55 of an optical encoder 500 according to an alternative embodiment of the present disclosure. The difference between FIG. 10A and FIG. 5B is that in FIG. 10A the tilted side of the trapezoid sensing surface of the first photodiode APD+ and the second photodiode APD− directs in the direction different from those in FIG. 5B. In FIG. 10A, a long side of two parallel sides of the trapezoid sensing surface of the first photodiode APD+ faces the detection photodiode array, and a short side of two parallel sides of the trapezoid sensing surface of the second photodiode APD− faces the detection photodiode array, and since arrangement of other elements are identical to those in FIG. 5B, details thereof are not repeated herein. FIG. 10B is a schematic diagram of a reference pattern recorded using the optical encoder 500 of FIG. 10A. As mentioned above, in other aspects the optical encoder 500 further records sub-reference patterns, e.g. referring to FIGS. 7A-7H, when the encoding medium 53 and the optical sensor 55 (or the package including the optical sensor 55) are at different relative positions.

Figure 11:
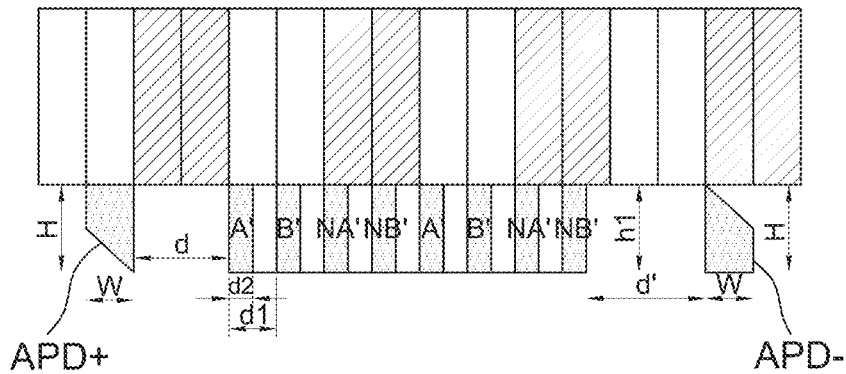
FIG. 11 is a schematic diagram of the encoding medium and optical sensor of an optical encoder according to an alternative embodiment of the present disclosure.

Although the above embodiments are illustrated in the way that the distances between the two alignment photodiodes and the detection photodiode array are identical (e.g., 3d1), and the widths (e.g., d2) of the two alignment photodiodes are identical to a half of the widths (e.g., d1) of the reflective parts 531 and the non-reflective parts 533, the present disclosure is not limited thereto. As shown in FIG. 11, a first distance d from the first photodiode APD+ to the detection photodiode array is different from a second distance d' from the second photodiode APD− to the detection photodiode array; and the widths W of the first photodiode APD+ and the second photodiode APD− are identical to the widths d1 of the reflective parts 531 and the non-reflective parts 533. As long as the alignment pattern, e.g., as shown in FIGS. 6 and 7A-7H associated with the output signals of the first photodiode APD+ and the second photodiode APD− are previously recorded, the objective of the position alignment in the assembling and installation procedure can still be realized.

In addition, in FIGS. 5B, 8A, 9A, 10A and 11, the height H1 of the alignment photodiodes is identical to the height h1 of the detection photodiode array, but the present disclosure is not limited thereto. In other aspects, the height H is selected to be different from h1.

Figure 12:
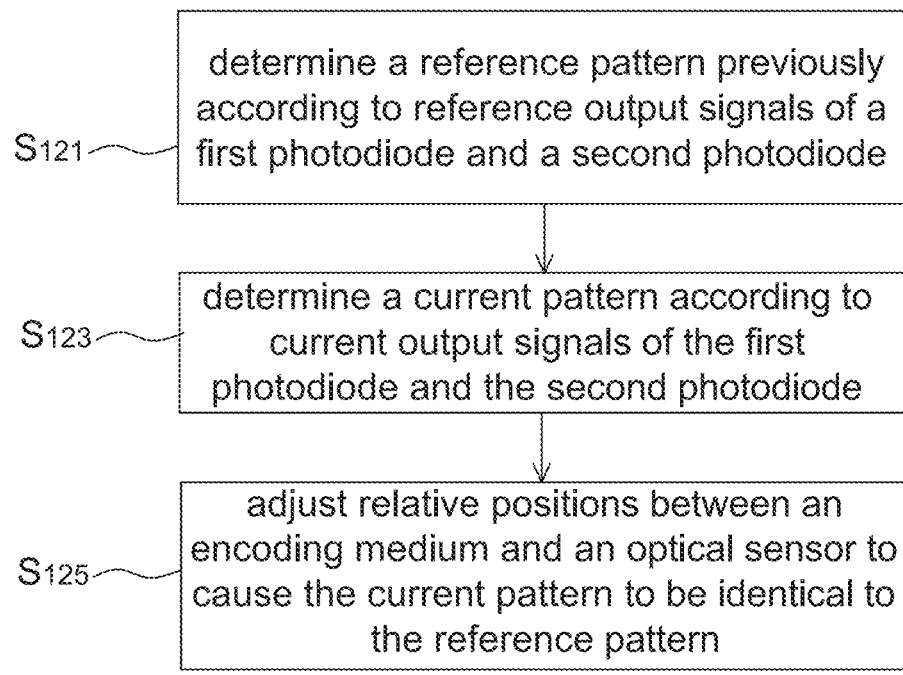
FIG. 12 is a flow chart of a position alignment method of an optical encoder according to one embodiment of the present disclosure.

Referring to FIG. 12, it is a flow chart of a position alignment method of an optical encoder 500 according to one embodiment of the present disclosure including the steps of: previously determining a reference pattern according to reference output signals of a first photodiode and a second photodiode (Step S121); determining a current pattern according to current output signals of the first photodiode and the second photodiode (Step S123); and adjusting relative positions between the encoding medium and the optical sensor to cause the current pattern to be identical to the reference pattern (Step S125).

Step S121: Before shipment, the encoding medium 53 and the optical sensor 55 are arranged at nominal relative positions (i.e. the predetermined relative positions) and then output signals of the first photodiode APD+ and the second photodiode APD− are obtained, wherein because said "output signals" are used as the basis for position alignment, they are called "reference output signals" in the present disclosure. As mentioned above, the reference output signals are generated by the TIA 57 through converting and amplifying photo current outputted by the first photodiode APD+ and the second photodiode APD− so as to generate voltage signals. After normalizing the voltage signals, the relationship between a first normalized voltage signal (e.g., normalized APD+ shown in figures) and a second normalized voltage signal (e.g., normalized APD− shown in figures) is obtained as the reference pattern as shown in FIG. 6, 8B, 9B or 10B. The reference pattern is previously recorded in the memory of the optical encoder 500.

Step S123: In the assembling and installation, the first photodiode APD+ and the second photodiode APD− generate, via the TIA 57, current output signals. The processor 59 generates a current pattern using the same way as generating the reference pattern (i.e. generating voltage signals using TIA and normalization). As mentioned above, when the encoding medium 53 and the optical detector 55 has a position deviation therebetween, the current pattern is not the same as the pre-stored reference pattern.

Step 125: The user changes, either manually or by automatic control, the relative positions between the encoding medium 53 and the optical sensor 55 to cause the current pattern to be substantially identical to the reference pattern, and then the position alignment is accomplished.

For example, the optical encoder 500 is connected to a display that shows real-timely the current pattern obtained in the Step S123 and the pre-stored reference pattern for the user to perform the alignment procedure.

In another aspect, the reference pattern is not previously stored or recorded in the memory of the optical encoder 500, but a theoretical reference pattern when the encoding medium 53 and the optical sensor 55 are arranged at nominal relative positions is known, e.g., similar to FIGS. 6, 8B, 9B and 10B. The current pattern obtained from output signals of the first photodiode APD+ and the second photodiode APD− are shown on, e.g., a screen of an oscilloscope. In this way, the alignment procedure is performed by changing relative positions between the encoding medium 53 and the optical sensor 55 to make the current pattern close to the theoretical pattern as much as possible to accomplish the position alignment method.

Figure 13:
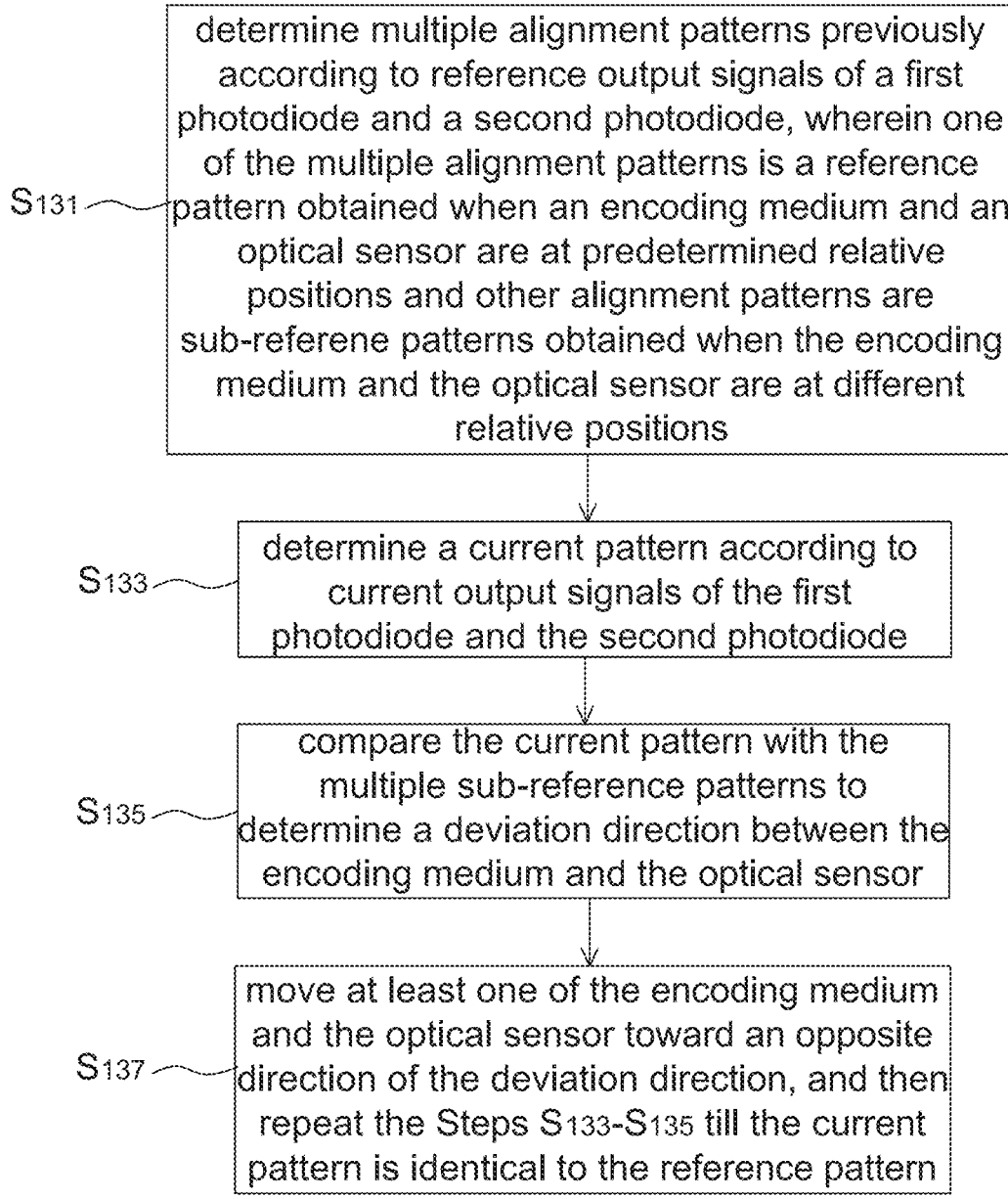
FIG. 13 is a flow chart of a position alignment method of an optical encoder according to another embodiment of the present disclosure.

Referring to FIG. 13, it is a flow chart of a position alignment method of an optical encoder 500 according to an alternative embodiment of the present disclosure including the steps of: previously determining multiple alignment patterns according to reference output signals of a first photodiode and a second photodiode, wherein one of the multiple alignment patterns is a reference pattern when an encoding medium and an optical sensor are at predetermined relative positions, and other alignment patterns are sub-reference patterns when the encoding medium and the optical sensor are at different relative positions (Step S131); determining a current pattern according to current output signals of the first photodiode and the second photodiode (Step S133); comparing the current pattern with the multiple sub-reference patterns to determine a deviation direction between the encoding medium and the optical sensor (Step S135); and moving at least one of the encoding medium and the optical sensor toward an opposite direction of the deviation direction, and then repeating the Step S131 to the Step S135 till the current pattern is identical to the reference pattern.

Step S131: Identical to the Step S121 of FIG. 12, this Step is also performed before shipment. In addition to the reference pattern, e.g., shown in FIG. 6, 8B, 9B or 10B, being previously recorded when the encoding medium 53 and the optical sensor 55 are at predetermined relative positions, the sub-reference patterns are further recorded when the encoding medium 53 and the optical sensor 55 are at different relative positions (not at nominal operating positions) as shown in FIGS. 7A-7H. In the present disclosure, the reference pattern and the sub-reference patterns are both referred to alignment patterns.

Step S133: This step is identical to the Step S123 in FIG. 12, and thus details thereof are not repeated herein.

Step S135: When the encoding medium 53 and the optical sensor 55 are not at nominal operating positions (i.e. the predetermined relative positions), the current pattern is substantially identical to one of the multiple sub-reference patterns but is not identical to the reference pattern. Accordingly, the user identifies a deviation direction between the encoding medium 53 and the optical sensor 55 according to the comparison result. For example, the optical encoder 500 is connected to a display that real-timely shows the current pattern obtained in the Step S133 and the pre-stored multiple alignment patterns for being compared by the user.

It is appreciated that a number of pre-stored alignment patterns is not particularly limited and is determined according to the memory space and alignment accuracy. In addition, the multiple alignment patterns are selected to be recorded in the memory of an external device or on the cloud outside the optical encoder 500, wherein the external device has a display used to real-timely show the current pattern and multiple alignment patterns for the user to perform the alignment procedure.

Step S137: The user moves at least one of the encoding medium 53 and the optical sensor 55 toward an opposite direction of the deviation direction, and the Steps S133-S135 are repeatedly executed till the current pattern is substantially identical to the reference pattern.

For example, if the user identifies in the Step S135 that the current pattern is substantially identical to FIG. 7D, it is able to identify that a current position of the optical sensor 55 has −a position deviation along the tangential direction and radius direction, and has −b position deviation along the height direction. In this case, the user firstly moves, for example, the optical sensor 55 by +b distance along the height direction to cause the current pattern to be substantially identical to FIG. 7C. Next, the user moves the optical sensor 55 by +a distance sequentially along the tangential direction and the radius direction till the current pattern is substantially identical to FIG. 6, and then the position alignment is accomplished. In addition, the user may perform the position alignment by moving the encoding medium 53. It is appreciated that in the alignment procedure, the processor 59 generates current patterns at a predetermined frequency for the comparison and alignment.

In other aspects, the above steps for the position alignment are performed by automatic control technology. For example, control software and/or firmware are previously drafted to control the relative positions of the encoding medium 53 and the optical sensor 55 via the motor. The alignment is not limited to be performed manually by the user.

In another aspect, the alignment patterns are not previously stored or recorded in the memory of the optical encoder 500, but theoretical alignment patterns when the encoding medium 53 and the optical sensor 55 are arranged at different relative positions are known, e.g., similar to FIGS. 7A-7H. The current pattern obtained from output signals of the first photodiode APD+ and the second photodiode APD− are shown on, e.g., a screen of an oscilloscope. In this way, the alignment procedure is performed by changing relative positions between the encoding medium 53 and the optical sensor 55 based on the highest similarity between the current pattern and the theoretical patterns associated with different relative positions to confirm a deviation direction. After the deviation direction is known, by performing the Step S137, the position alignment method is accomplished.

It should be mentioned that although the above embodiments are illustrated by using a pair of alignment photodiodes as an example, the present disclosure is not limited thereto. In other aspects, the optical encoder 500 includes multiple pairs of alignment photodiodes, e.g., a combination of FIGS. 5B, 8A, 9A, 10A and 11 as long as the alignment patterns associated with each pair of alignment photodiodes are previously recorded.

In addition, the shape and size of the alignment photodiodes are not limited to those given in the present disclosure. The position alignment of the present disclosure is achievable by previously recording a reference pattern (similar to FIGS. 6, 8B, 9B and 10B) associated with each pair of alignment photodiodes and reproducing the reference pattern in the alignment procedure by changing relative positions of elements.

As mentioned above, the conventional optical encoder can have a position deviation during the assembling and installation to degrade the accuracy of position identification, and high cost is required to perform tighter assembling and installation control. Accordingly, the present disclosure further provides an optical encoder having alignable relative positions between elements (e.g., FIG. 5B) and a position alignment method thereof (e.g., FIGS. 12 and 13) that achieve the low cost position alignment by arranging at least one set of additional alignment photodiodes and by previously recording a reference pattern associated with output signals of the at least one set of alignment photodiodes at nominal operating positions.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoder, comprising:
an optical sensor configured to receive modulated light from an encoding medium, and comprising:
a detection photodiode array arranged opposite to the encoding medium; and
a first photodiode and a second photodiode respectively arranged at two sides of the detection photodiode array, and each of the first photodiode and the second photodiode having a trapezoid sensing surface,
wherein a long side of two parallel sides of the trapezoid sensing surface of each of the first photodiode and the second photodiode faces the detection photodiode array.

2. The optical encoder as claimed in claim 1, wherein the detection photodiode array is arranged at a same track with the first photodiode and the second photodiode.

3. The optical encoder as claimed in claim 1, wherein
the encoding medium has codes thereon configured to modulate incident light,
the codes on the encoding medium comprise reflective parts and non-reflective parts, and
a width of a sensing surface of every photodiode of the detection photodiode array is a half of a width of the reflective parts and the non-reflective parts.

4. The optical encoder as claimed in claim 1, wherein a first distance from the first photodiode to a first side of the detection photodiode array is identical to a second distance from the second photodiode to a second side of the detection photodiode array.

5. The optical encoder as claimed in claim 1, wherein a first distance from the first photodiode to a first side of the detection photodiode array is different from a second distance from the second photodiode to a second side of the detection photodiode array.

6. The optical encoder as claimed in claim 1, wherein
the encoding medium has codes thereon configured to modulate incident light,
the codes on the encoding medium comprise reflective parts and non-reflective parts, and
the first photodiode is opposite to one of the reflective parts and the second photodiode is opposite to one of the non-reflective parts.

7. The optical encoder as claimed in claim 1, wherein
the encoding medium has codes thereon configured to modulate incident light,
the codes on the encoding medium comprise reflective parts and non-reflective parts, and
a width of the first photodiode and the second photodiode is identical to a width of the reflective parts and the non-reflective parts.

8. The optical encoder as claimed in claim 1, wherein
the encoding medium has codes thereon configured to modulate incident light,
the codes on the encoding medium comprise reflective parts and non-reflective parts, and
a width of the first photodiode and the second photodiode is a half of a width of the reflective parts and the non-reflective parts.

9. The optical encoder as claimed in claim 1, wherein a tilted side of the trapezoid sensing surface of each of the first photodiode and the second photodiode directs to a same direction.

10. The optical encoder as claimed in claim 1, wherein a tilted side of the trapezoid sensing surface of each of the first photodiode and the second photodiode directs to a different direction.

11. The optical encoder as claimed in claim 1, further comprising a memory configured to previously record a reference pattern associated with reference output signals of the first photodiode and the second photodiode when the encoding medium and the optical sensor are at predetermined relative positions.

12. The optical encoder as claimed in claim 1, further comprising a memory configured to previously record multiple alignment patterns associated with reference output signals of the first photodiode and the second photodiode when the encoding medium and the optical sensor are at different relative positions.

13. A position alignment method of the optical encoder of claim 1, the alignment method comprising:
previously determining a reference pattern according to reference output signals of the first photodiode and the second photodiode;
determining a current pattern according to current output signals of the first photodiode and the second photodiode; and
adjusting relative positions between the encoding medium and the optical sensor to cause the current pattern to be identical to the reference pattern.

14. The position alignment method as claimed in claim 13, wherein the reference output signals and the current output signals are normalized voltage signals.

15. The position alignment method as claimed in claim 13, wherein the relative positions comprise a tangential direction position, a radius direction position and a height direction position.

16. A position alignment method of the optical encoder of claim 1, the alignment method comprising:
previously determining multiple alignment patterns according to reference output signals of the first photodiode and the second photodiode, wherein one of the multiple alignment patterns is a reference pattern when the encoding medium and the optical sensor are at predetermined relative positions, and other alignment patterns are sub-reference patterns when the encoding medium and the optical sensor are at different relative positions;
Step A: determining a current pattern according to current output signals of the first photodiode and the second photodiode;
Step B: comparing the current pattern with the multiple sub-reference patterns to determine a deviation direction between the encoding medium and the optical sensor; and
Step C: moving at least one of the encoding medium and the optical sensor toward an opposite direction of the deviation direction, and then repeating the Step A to the Step C till the current pattern is identical to the reference pattern.

17. The position alignment method as claimed in claim 16, wherein the deviation direction comprises a tangential direction, a radius direction and a height direction.

18. The position alignment method as claimed in claim 16, wherein the reference output signals and the current output signals are normalized voltage signals.

19. An optical encoder, comprising:
- an optical sensor configured to receive modulated light from an encoding medium, and comprising:
  - a detection photodiode array arranged opposite to the encoding medium; and
  - a first photodiode and a second photodiode respectively arranged at two sides of the detection photodiode array, and each of the first photodiode and the second photodiode having a trapezoid sensing surface, wherein
- a long side of two parallel sides of the trapezoid sensing surface of the first photodiode faces the detection photodiode array; and
- a short side of two parallel sides of the trapezoid sensing surface of the second photodiode faces the detection photodiode array.

* * * * *